Nov. 11, 1958     S. WALLIN     2,859,863
CONTROL APPARATUS FOR TRANSPORTING DEVICES
Filed Oct. 22, 1956
FIG. 1.
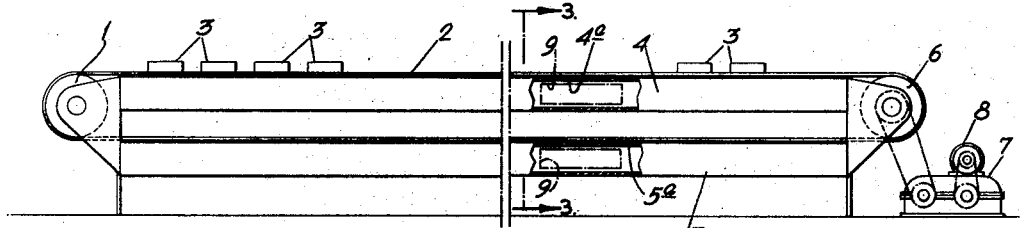
FIG. 2.
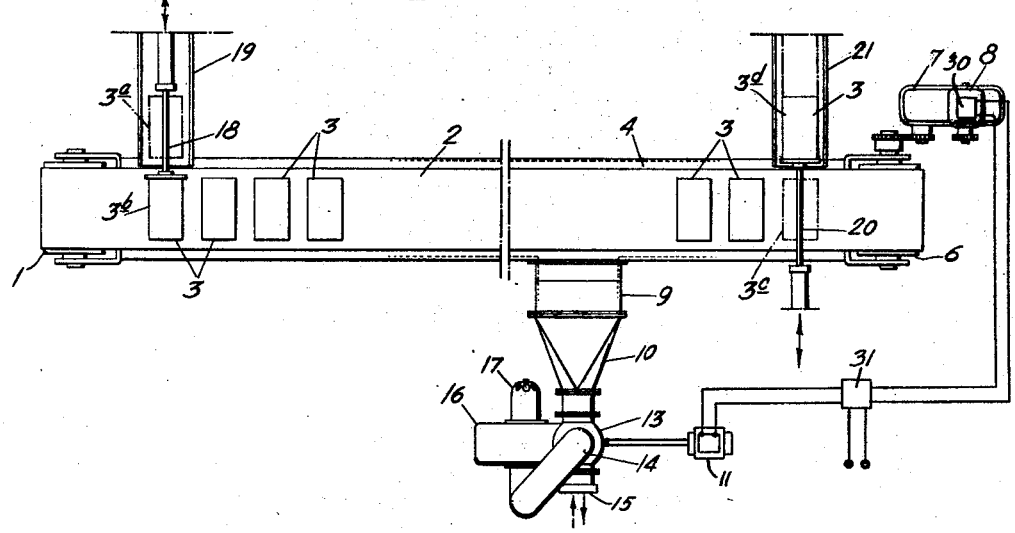
FIG. 3.          FIG. 4.
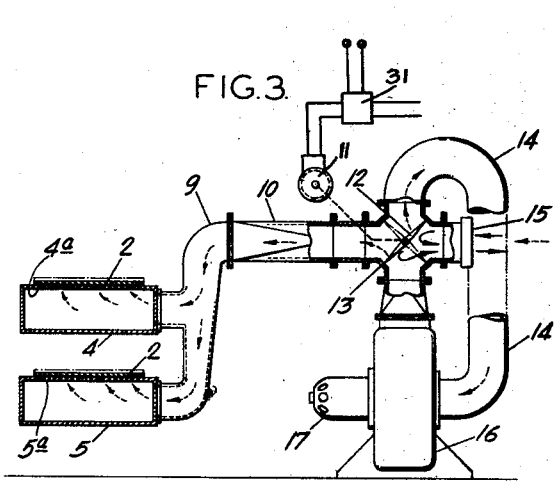 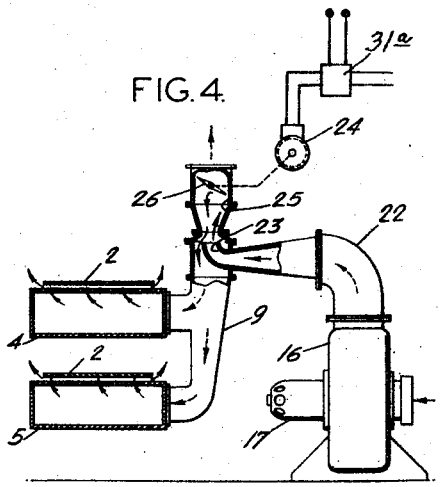
INVENTOR:
SVEN WALLIN
BY Howson & Howson
ATTYS.

United States Patent Office 2,859,863
Patented Nov. 11, 1958

2,859,863

CONTROL APPARATUS FOR TRANSPORTING DEVICES

Sven Wallin, Jonkoping, Sweden, assignor to Aktiebolaget Svenska Flaktfabriken, Stockholm, Sweden Application October 22, 1956, Serial No. 617,544

Claims priority, application Sweden October 22, 1955

3 Claims. (Cl. 198—135)

The present invention relates to apparatus for controlling the operation of transporting devices, and has particular application to transporting devices comprising an endless band or belt conveyor for transporting piece goods.

In such transporting devices, the goods are moved from a loading point to an unloading point by means of an intermittently driven band. Transporting devices of this character are primarily used for transporting piece goods through a treatment chamber or other apparatus and for transporting goods to and from or between two operations of this kind. In such cases, it is necessary to have the movement of the conveyor precisely and accurately controlled with respect both to the length and to the duration of the travel in order to synchronize the transporting of the goods with the running of the apparatus in other respects. The drive motor of the conveyor must therefore start and stop exactly and instantaneously which may be accomplished by conventional guiding and braking means. In practice, however, the transporting band or belt easily slides on the turning rolls because of the inertia of the belt in stopping and starting. The sliding of the belt changes the length and the timing of the movement of the conveyor in the intermittent operation of the drive means, and also causes jerky and uneven running of the band so that the goods may be displaced on the band and in certain cases, may also become damaged.

A primary object of the present invention is to eliminate these drawbacks by providing soft acceleration and running of the band and an instantaneous slowing up of the band.

More specifically, the invention provides an air distributing chamber below the transporting run of the conveyor whereby a gaseous medium is supplied through a perforated upper wall in the chamber towards the underside of the band to form a cushion or layer supporting the band during running of the band. When the band is stopped for loading and unloading, gaseous medium is withdrawn from the chamber to cause the band to engage against the upper wall of the chamber.

In accordance with a suitable embodiment of the invention, reversing the flow direction in the chamber may be performed by positioning the supply duct for the gaseous medium in an outlet opening arranged in the center of an inlet hood connected to the distributing chamber. The outlet opening during advance of the band is closed by means of a valve which is synchronized with the loading and unloading means. The valve is opened during the loading and unloading intervals to thereby cause the medium to flow out freely, and by means of an ejector action effects reversal of the flow direction of the medium through the perforated upper wall of the distributing chamber.

All of the objects of the invention and the various details and details of the construction and operation thereof are more fully set forth hereinafter with reference to the accompanying drawings wherein:

Fig. 1 is a side elevational view with portions broken away of a transporting device provided with an air distributing member and a fan assembly in accordance with the present invention;

Fig. 2 is a plan view of the device shown in Fig. 1 with electrical connections therefor shown schematically;

Fig. 3 is a sectional view taken on the line 3—3 of Fig. 1; and

Fig. 4 is a sectional view similar to Fig. 3 showing a modified embodiment of the fan assembly connected to the distributing chambers.

In the drawing, an endless band or belt conveyor 2 is stretched between two pulleys or turning rolls 1 and 6 respectively. The conveyor 2 transports piece goods 3 by intermittently operating the conveyor. Precise timing of the operation of the band advances the goods between fixed loading and unloading points designated 19 and 21 respectively. In the illustrated embodiment, the loading of the goods is performed automatically by means of a plunger 18 or similar reciprocatory means which moves the goods from the position 3a to the position 3b on the conveyor. In like manner, unloading is performed by a member 20 which displaces the goods between the positions 3c and 3d. The loading and unloading means do not constitute a part of the invention, and may be of any other form, or may be replaced by manual operations.

The conveyor 2 is driven intermittently by means of a motor 8 connected through a gear box 7 to the turning roll 6. The drive motor is started and stopped by a starting rheostat, as shown in the drawing at 30 which is controlled by the mechanism for actuating the loading and unloading means by connections not shown in the drawings, so that the running of the band is synchronized with these means.

In accordance with the invention, an air distributing chamber 4 is disposed below the carrying run of the conveyor 2. The upper wall 4a of the chamber faces the band and is perforated or formed with evenly distributed openings for blowing out the medium. In some cases, it may be desired to provide a similar air distributing chamber 5 having a perforated upper wall 5a below the return run of the band. The distributing chambers are connected through the inlet hood 9 and ducts 10, 13, and 14 to a fan 16 driven by a motor 17. By means of the fan, a gaseous medium—usually air—is supplied to the chambers during movement of the conveyor and forms a cushion supporting the runs of the conveyor. When the band is stopped for loading and unloading, it is drawn against the upper wall of the chambers by reversing the flow through the hood 9 and duct 10.

In the embodiment shown in Fig. 3, the reversing of the flow of air in the duct 10 is accomplished by means of a four-way valve 12 mounted in the duct 13 which is designed as a two-way valve housing. In the position shown in broken lines, the air is sucked in through the opening 15 of the valve housing communicating with the room where the transporting device is positioned. The air passes through the pipe 14 to the inlet of the fan 16 which blows the air through the duct 10 and the inlet hood 9 into the distributing chambers 4 and 5. During loading and unloading, the valve 12 is turned about 90 degrees to the position shown in full lines and the fan then sucks air from the distributing chambers and blows the air out into the room through the opening 15. The valve may also be connected for slow rotation and driven by the conveyor in synchronization therewith as indicated at 31, for instance by means of a device 11 feeding step by step so that the valve, upon arrest of the conveyor, takes the position for reversing the air flow. Instead of the arrangement shown in Fig. 3, it is possible to use two fans, one blowing and one sucking fan which alternately are connected with the distributing chambers.

Another arrangement for reversing the air direction is shown in Fig. 4. In this case, the inlet hood 9 is connected with the discharge opening of the fan 16 by means of a pipe 22 having an ejector-shaped jet leading into the hood 9 in the center of an outlet opening 25. A valve 26 is mounted in the outlet opening, and during movement of the band, the valve closes the opening as shown in full lines so that a positive pressure results in the inlet hood and distributing chambers. When the damper 26 is in its open position (not shown), the air discharging from the jet 23 causes an ejector action whereby a negative pressure is induced in the distributing chambers and the direction of air flow through the perforations will be reversed. The valve 26 is reversed automatically by reversing means 24 of known form, and is synchronized with the loading and unloading, for example, by connections indicated at 31a.

While particular embodiments of the present invention have been herein illustrated and described, it is not intended to limit the invention to such disclosure, but changes and modifications may be made therein and thereto within the scope of the following claims:

What I claim is:

1. In a transporting device comprising an endless belt conveyor, driving means intermittently operable to drive said conveyor for transporting piece-like goods between loading and unloading points, a medium distributing box positioned directly under at least the carrying run of the conveyor, and having a perforated upper wall underlying said conveyor run, blower means operatively connected to said distributing box and including control means operable in a first position to direct gaseous medium into said box and outwardly through said upper wall to form a film of said medium supporting the conveyor in its travel, and operable in a second position to withdraw gaseous medium from said box and inwardly through said perforated wall to withdraw said film and effect engagement of said conveyor against said upper wall, and regulating means actuating said control means to its first position during the operation of said drive means and actuating said control means to its second position during the loading and unloading intervals between said operation of the drive means.

2. Apparatus according to claim 1 wherein said control means comprises a four-way valve connected to the inlet and outlet of the blower means, the distributing box and the space surrounding said transporting device, said valve in said first position connecting said box with said blower outlet and said space with the blower inlet, and in said second position connecting said box with said blower inlet and said space with the blower outlet, and an actuator for said valve.

3. Apparatus according to claim 1 wherein said control means comprises an inlet hood connected to at one end said distributing box and open at the other end to the space surrounding said transporting device, a medium supply duct connected at one end to the outlet of said blower and having at the other end a restricted outlet in the center of the opening in the other end of said hood directed toward said space, valve means operable in its first position to close said opening to direct the medium from said supply duct into said box and in its second position to open said opening to direct the medium from said supply duct therethrough and effect flow from said hood and said box by an ejector action, and an actuator for said valve synchronized with said drive means to position said valve in its first position during operation of said drive means and in its second position during the intervals between operations of said drive means.

References Cited in the file of this patent

UNITED STATES PATENTS 756,600   Dodge _____ Apr. 5, 1904

FOREIGN PATENTS 750,824   Great Britain _____ June 20, 1956